United States Patent
Nilsson et al.

(10) Patent No.: US 9,593,976 B2
(45) Date of Patent: Mar. 14, 2017

(54) PULSED LEVEL GAUGE SYSTEM AND METHOD

(71) Applicant: Rosemount Tank Radar AB, Gothenburg (SE)

(72) Inventors: Leif Nilsson, Linkoping (SE); Hakan Delin, Linkoping (SE); Hakan Nyberg, Linkoping (SE)

(73) Assignee: Rosemount Tank Radar AB, Gothenburg (SE)

(*) Notice: Subject to any disclaimer, the term of this patent is extended or adjusted under 35 U.S.C. 154(b) by 515 days.

(21) Appl. No.: 14/281,239

(22) Filed: May 19, 2014

(65) Prior Publication Data
US 2015/0330825 A1    Nov. 19, 2015

(51) Int. Cl.
*G01F 23/284* (2006.01)
*G01S 7/28* (2006.01)
(Continued)

(52) U.S. Cl.
CPC .............. *G01F 23/284* (2013.01); *G01S 7/28* (2013.01); *G01S 7/2923* (2013.01); *G01S 13/10* (2013.01);
(Continued)

(58) Field of Classification Search
CPC ........ G01F 23/284; G01S 7/28; G01S 7/2923; G01S 13/10; G01S 13/103; G01S 13/227; G01S 13/88; G01S 13/30
See application file for complete search history.

(56) References Cited

U.S. PATENT DOCUMENTS 4,521,778 A * 6/1985 Knepper ............... G01S 7/03
                                                    342/134
6,192,752 B1   2/2001 Blaine
(Continued)

FOREIGN PATENT DOCUMENTS

DE   10 2005 022 558   11/2006
EP         2 680 027    1/2014
WO      WO 02/067011    8/2002

OTHER PUBLICATIONS

Communication from EP Application No. 15166770.6, dated Oct. 6, 2015.

*Primary Examiner* — Regis Betsch
(74) *Attorney, Agent, or Firm* — Westman, Champlin & Koehler, P.A.

(57) ABSTRACT

The present invention relates to a pulsed level gauge system comprising frequency control circuitry. If an acquired signal indicates that the time between the previous filling level determination and the present filling level determination is shorter than a predefined time, the frequency control circuitry controls at least one of a transmit signal generating circuitry and a reference signal generating circuitry comprised in the pulsed level gauge system using previous frequency control settings stored in memory. If the acquired signal indicates that the time between the previous filling level determination and the present filling level determination is longer than the predefined time, the frequency control circuitry iteratively regulates at least one of the transmit signal generating circuitry and the reference signal generating circuitry towards achieving a desired pulse repetition frequency difference between the pulse repetition frequency of the transmit signal and the pulse repetition frequency of the reference signal.

13 Claims, 4 Drawing Sheets

(51) Int. Cl.
*G01S 7/292* (2006.01)
*G01S 13/10* (2006.01)
*G01S 13/22* (2006.01)
*G01S 13/88* (2006.01)
*G01S 13/30* (2006.01)

(52) U.S. Cl.
CPC .......... *G01S 13/103* (2013.01); *G01S 13/227* (2013.01); *G01S 13/88* (2013.01); *G01S 13/30* (2013.01)

(56) References Cited

U.S. PATENT DOCUMENTS

| | | | |
|---|---|---|---|
| 6,700,530 B1* | 3/2004 | Nilsson | G01S 7/03 342/124 |
| 7,412,337 B2* | 8/2008 | Michalski | G01F 23/284 702/55 |
| 7,619,558 B2 | 11/2009 | Griessbaum | |
| 2008/0105048 A1* | 5/2008 | Nilsson | G01F 23/284 73/290 V |
| 2011/0000295 A1 | 1/2011 | Kritlow | |
| 2011/0140951 A1* | 6/2011 | Nyberg | G01F 23/0069 342/124 |
| 2012/0274500 A1* | 11/2012 | Nyberg | G01F 23/284 342/124 |
| 2014/0005959 A1 | 1/2014 | Nilsson et al. | |

* cited by examiner

PULSED LEVEL GAUGE SYSTEM AND METHOD

FIELD OF THE INVENTION

The present invention relates to a pulsed level gauge system and to a method of controlling such a pulsed level gauge system.

TECHNICAL BACKGROUND

Radar level gauge (RLG) systems are in wide use for determining the filling level of a product contained in a tank. Radar level gauging is generally performed either by means of non-contact measurement, whereby electromagnetic signals are radiated towards the product contained in the tank, or by means of contact measurement, often referred to as guided wave radar (GWR), whereby electromagnetic signals are guided towards and into the product by a probe acting as a waveguide. The probe is generally arranged to extend vertically from the top towards the bottom of the tank. The probe may also be arranged in a measurement tube, a so-called chamber, connected to the outer wall of the tank and in fluid connection with the inside of the tank.

The transmitted electromagnetic signals are reflected at the surface of the product, and the reflected signals are received by a receiver or transceiver comprised in the radar level gauge system. Based on the transmitted and reflected signals, the distance to the surface of the product can be determined.

More particularly, the distance to the surface of the product is generally determined based on the time between transmission of an electromagnetic signal and reception of the reflection thereof in the interface between the atmosphere in the tank and the product. In order to determine the actual filling level of the product, the distance from a reference position to the surface is determined based on the above-mentioned time (the so-called time-of-flight) and the propagation velocity of the electromagnetic signals.

Most radar level gauge systems on the market today are either so-called pulsed radar level gauge systems that determine the distance to the surface of the product contained in the tank based on the difference in time between transmission of a pulse and reception of its reflection at the surface of the product, or systems that determine the distance to the surface based on the frequency (and/or phase) difference between a transmitted frequency-modulated signal and its reflection at the surface. The latter systems are generally referred to as being of the FMCW (Frequency Modulated Continuous Wave) type.

For pulsed radar level gauge systems, time expansion techniques are generally used to resolve the time-of-flight.

Such pulsed radar level gauge systems may have a first oscillator for generating a transmit signal formed by pulses for transmission towards the surface of the product contained in the tank with a transmitted pulse repetition frequency $f_t$, and a second oscillator for generating a reference signal formed by reference pulses with a reference pulse repetition frequency $f_{ref}$ that differs from the transmitted pulse repetition frequency by a known (at least approximately known) pulse repetition frequency difference $\Delta f$. This frequency difference $\Delta f$ is typically in the range of Hz or tens of Hz.

At the beginning of a measurement sweep, the transmit signal and the reference signal are synchronized to have the same phase. Due to the frequency difference $\Delta f$, the phase difference between the transmission signal and the reference signal will gradually increase during the measurement sweep.

During the measurement sweep, the reflection signal formed by the reflection of the transmission signal at the surface of the product contained in the tank may for example be correlated with the reference signal, so that an output signal is only produced when a reflected pulse and a reference pulse occur at the same time. In such exemplary pulsed level gauge systems, the time from the start of the measurement sweep to the occurrence of the output signal resulting from the correlation of the reflection signal and the reference signal is a measure of the phase difference between the transmit signal and the reflection signal, which is in turn a time expanded measure of the time-of-flight of the reflected pulses, from which the distance to the surface of the product contained in the tank can be determined.

Since the accuracy of the pulse repetition frequency difference $\Delta f$ between pulse repetition frequency of the transmit signal and the pulse repetition frequency of the reference signal is important to the performance of the pulsed radar level gauge system, the first and/or second oscillator can be controlled by a frequency regulator that monitors the pulse repetition frequency difference $\Delta f$ and controls at least one of the first and the second oscillator to minimize a difference between an actual value and a desired value of the pulse repetition frequency difference.

To provide a stable regulation, the regulator may need in the order of hundreds of samples of the frequency difference $\Delta f$, which corresponds to a time duration which can be as long as 20-30 seconds.

Accordingly, currently available pulsed radar level gauge systems may need to be powered for a substantial period of time before the actual filling level measurement can start.

U.S. Pat. No. 7,412,337 discloses a method aimed at reducing the time needed to control the first and/or second oscillator to achieve the desired frequency difference $\Delta f$. In the method according to U.S. Pat. No. 7,412,337, the gradient of at least two control variable-difference frequency data points is determined, and on the basis of the gradient and the difference frequency, an operating point of the control is determined and the control algorithm is adjusted. The method according to U.S. Pat. No. 7,412,337, however, appears relatively complicated and cumbersome, and there also appears to be room for further improvement in respect of reducing the time needed for the control.

SUMMARY

In view of the above, a general object of the present invention is to provide an improved pulsed radar level gauge system and method, and in particular a pulsed radar level gauge system and method enabling a more energy efficient filling level determination.

According to a first aspect of the present invention, it is therefore provided a method of determining a filling level of a product in a tank, using a level gauge system comprising: transmit signal generating circuitry for generating pulsed electromagnetic transmit signals; a propagation device connected to the transmit signal generating circuitry and arranged to propagate the transmit signals towards a surface of the product, and to return electromagnetic reflection signals resulting from reflection of the transmit signals at the surface; and reference signal generating circuitry for generating pulsed electromagnetic reference signals, the method comprising the steps of: controlling at least one of the transmit signal generating circuitry and the reference signal generating circuitry using first frequency control settings selected to achieve a desired pulse repetition frequency difference between a pulse repetition frequency of the transmit signals and a pulse repetition frequency of the reference signals; transmitting a first transmit signal towards the surface; receiving a first reflection signal resulting from reflection of the first transmit signal at the surface; generating a first reference signal; determining a first filling level measurement value level based on the first reflection signal and the first reference signal; determining an actual pulse repetition frequency difference between the pulse repetition frequency of the first transmit signal and the pulse repetition frequency of the first reference signal; determining second frequency control settings based on the first frequency control settings and a difference between the desired pulse repetition frequency and the actual pulse repetition frequency difference; storing the second frequency control settings; acquiring a signal indicative of a time between consecutive filling level determinations; if the acquired signal indicates that the time between consecutive filling level determinations is shorter than a predefined time: retrieving the second frequency control settings; controlling at least one of the transmit signal generating circuitry and the reference signal generating circuitry using the second frequency control settings; transmitting a second transmit signal towards the surface; receiving a second reflection signal resulting from reflection of the second transmit signal at the surface; generating a second reference signal; and determining a second filling level measurement value based on the second reflection signal and the second reference signal; if the acquired signal indicates that the time between consecutive filling level determinations is longer than the predefined time: regulating a pulse repetition frequency of at least one of the transmit signal generating circuitry and the reference signal generating circuitry towards achieving the desired pulse repetition frequency difference; transmitting a third transmit signal towards the surface; receiving a third reflection signal resulting from reflection of the third transmit signal at the surface; generating a third reference signal; and determining a third filling level measurement value based on the third reflection signal and the third reference signal.

The pulsed electromagnetic transmit and reference signals referred to above may be so-called DC-pulses, or pulsed signals may be provided in the form of a carrier signal that is amplitude modulated by a DC-pulse having a pulse repetition frequency.

The acquired signal indicative of a time between consecutive filling level determinations may be any signal from which the time since the most recent filling level determination can be at least approximately deduced. For instance, the acquired signal may indicate an update rate, or the time that has actually passed since any event included in a previous filling level determination, such as the transmission of a previous transmit signal, output of a previous filling level measurement value or a power down of (part of) the pulsed level gauge system.

The signal may, for example, be acquired by receiving a signal from a remote host, by reading a configuration setting in a memory, or by polling a timer etc.

It should be understood that "regulating" the pulse repetition frequency of at least one of the transmit signal generating circuitry and the reference signal generating circuitry towards achieving the desired pulse repetition frequency difference involves more than simply controlling at least one of the transmit signal generating circuitry and the reference signal generating circuitry using frequency control settings. The regulating step involves iterative control of at least one of the transmit signal generating circuitry and the reference signal generating circuitry in a feedback configuration, so that the frequency control settings applied gradually approach frequency control settings resulting in a pulse repetition frequency difference that is sufficiently close to the desired pulse repetition frequency difference.

If/when a frequency difference is considered to be sufficiently close to the desired frequency difference will depend on the system design, in particular the design of band pass filters etc. If it is deemed by the system designer that acceptable measurement performance for a given application can be achieved within a certain range around a desired frequency difference, then the frequency difference values within that range are sufficiently close to the desired frequency difference.

The present invention is based on the realization that it may not always be necessary to regulate the pulse repetition frequency difference before performing a filling level measurement, even if the filling level gauge has been in a sleep state/powered down. If it can be determined that it is likely that previously used frequency control settings will result in substantially the desired pulse repetition frequency difference, no additional measurement of the pulse repetition frequency difference needs to be made, but the transmit signal generating circuitry and/or the reference signal generating circuitry can directly be controlled using stored frequency control settings from the previous filling level measurement, even without measuring the resulting pulse repetition frequency difference. The present inventors have further realized that if the time since the most recent filling level determination is sufficiently short, it is likely that the same, or similar, frequency control settings as in the most recent filling level determination can be used directly, without the need for regulation of the pulse repetition frequency difference. It is per se known that changes in environmental conditions, such as the temperature of the transmit signal generating circuitry and/or the reference signal generating circuitry, may have an impact on the frequency resulting from the application of given frequency control settings. If a short time has passed, it is more likely that only small changes in environmental conditions have occurred than if a long time has passed. A short time may be in the order of minutes, and a long time may be in the order of hours. It may also be possible to additionally use other acquired signals for determining if the stored frequency control settings should be used, or if a new regulation should be performed. Such an other acquired signal may be a signal indicative of the temperature or a change in temperature. A new regulation may advantageously start from the stored frequency control settings, as this may reduce the time needed for successful regulation.

At least for some applications and/or at times, this may result in more efficient intermittent operation of the pulsed level gauge system, since the time from the level gauge system is powered on until a filling level measurement value can be output can be made shorter, at least on the average. This will result in a reduced energy consumption compared to the case when regulation of the pulse repetition frequency difference is carried out every time the pulsed level gauge system is transitioned from an idle state to an active state to perform a filling level measurement.

According to various embodiments of the present invention, the first filling level measurement value may be determined additionally based on the desired pulse repetition frequency difference.

Furthermore, the method according to embodiments of the present invention may additionally comprise the step of determining an actual pulse repetition frequency difference between the pulse repetition frequency of the first transmit signal and the pulse repetition frequency of the first reference signal.

Advantageously, moreover, the second frequency control settings may be determined by adjusting the first frequency control settings based on a difference between the actual pulse repetition frequency difference and the desired pulse repetition frequency difference.

This determination of the second frequency control settings may be performed in connection with the filling level measurement resulting in determination of the first filling level measurement value. Alternatively, the first frequency control settings and the determined actual frequency difference may be stored in a memory and the second frequency control settings be determined in connection with the following determination of the second filling level measurement value.

According to embodiments, furthermore, the first filling level measurement value may be determined additionally based on the actual pulse repetition frequency difference.

Advantageously, the method according to embodiments of the present invention may further comprise the steps of providing a wake-up signal to the level gauge system prior to the step of transmitting the first transmit signal; and providing a sleep signal to the level gauge system after the step of determining the first filling level measurement value and before the step of transmitting the second transmit signal. In other words, the pulsed level gauge system may advantageously be operated intermittently to save energy. This is particularly advantageous for embodiments that operate using a local energy store, such as a battery and/or a super capacitor and/or a capacitor etc.

According to various embodiments of the method of the present invention, the second filling level measurement value may be determined based additionally on stored data indicative of at least one previous filling level measurement value, if the acquired signal indicates that the time between consecutive filling level determinations is shorter than the predefined time.

For intermittent operation of a level gauge system with alternating active and inactive periods, the amount of energy that has to be spent to get a sufficiently accurate filling level determination may be different from active period to active period. This insight can be used to further reduce the average energy consumption by determining how many measurements are needed to achieve a reliable filling level determination based on the time between consecutive active periods for the level gauge system.

If the time since the last active period/the previous filling level measurement is longer than a predefined time (which may be the same as the time for deciding whether or not the same or similar frequency control settings can be used), several measurements—a burst of measurements—can be performed and the results of these measurements can be filtered, for example by averaging, to get a reliable and accurate filling level which is stored in memory.

If, on the other hand, the time since the last active period/the previous filling level measurement is shorter than the predefined time (which may be the same as the time for deciding whether or not the same or similar frequency control settings can be used) it may be concluded that it is likely that the filling level would be substantially the same as the last time a measurement was performed. In this case, a new filling level value can be determined based on a combination of the first measurement performed during the current active period and at least one stored measurement value.

In addition, a difference between the second filling level measurement value and the first filling level measurement value may be evaluated to determine if a single filling level measurement is enough or if a burst of measurements should be carried out.

From time to time, such as periodically with a predefined period, a "full" measurement cycle with a sufficient number of measurements to provide for a high accuracy filling level determination, for example through filtering, may be performed even if the time between consecutive filling level determination events is shorter than the above-mentioned predefined time.

According to a second aspect of the present invention, it is provided a level gauge system, for determining a filling level measurement value for a product in a tank, comprising: transmit signal generating circuitry for generating a pulsed electromagnetic transmit signal; a propagation device connected to the transmit signal generating circuitry and arranged to propagate the transmit signal towards a surface of the product, and to return an electromagnetic reflection signal resulting from reflection of the transmit signal at the surface; reference signal generating circuitry for generating a pulsed electromagnetic reference signal; filling level determining circuitry connected to the propagation device and to the reference signal generating circuitry for determining the filling level measurement value based on the reflection signal, the reference signal, and a pulse repetition frequency difference between a pulse repetition frequency of the transmit signal and a pulse repetition frequency of the reference signal; a memory for storing previous frequency control settings for control of at least one of the transmit signal generating circuitry and the reference signal generating circuitry to achieve the pulse repetition frequency difference, the previous frequency control settings being determined in connection with a previous filling level determination; signal acquisition circuitry for acquiring a signal indicative of a time between the previous filling level determination and a present filling level determination; comparing circuitry connected to the signal acquisition circuitry for comparing the time indicated by the signal with a predefined time; frequency control circuitry connected to the comparing circuitry, to the memory, and to at least one of the transmit signal generating circuitry and the reference signal generating circuitry for: if the acquired signal indicates that the time between the previous filling level determination and the present filling level determination is shorter than the predefined time, controlling at least one of the transmit signal generating circuitry and the reference signal generating circuitry using the previous frequency control settings stored in the memory; and if the acquired signal indicates that the time between the previous filling level determination and the present filling level determination is longer than the predefined time, iteratively regulating at least one of the transmit signal generating circuitry and the reference signal generating circuitry towards achieving a desired pulse repetition frequency difference between the pulse repetition frequency of the transmit signal and the pulse repetition frequency of the reference signal.

The propagation device may be any device capable of propagating electromagnetic signals, including transmission line probes, waveguides and various types of radiating antennas such as horn antennas, parabolic antennas, rod antennas, array antennas etc.

It should be noted that the filling level determining circuitry, the signal acquisition circuitry, the comparing circuitry, as well as the frequency control circuitry may be implemented as one or several microprocessors comprised in the level gauge system.

The tank may be any container or vessel capable of containing a product, and may be metallic, or partly or completely non-metallic, open, semi-open, or closed. Furthermore, the filling level of the product contained in the tank may be determined directly by arranging the propagation device to propagate the transmission signal towards the product inside the tank, or indirectly by arranging the propagation device inside a so-called chamber located on the outside of the tank, but being in fluid connection with the inside of the tank in such a way that the level in the chamber corresponds to the level inside the tank.

Either or both of the transmission signal generating circuitry and the reference signal generating circuitry may comprise a voltage controlled oscillator circuit, which may comprise a crystal oscillator. The frequency control parameter may then be a control voltage provided to the voltage controlled oscillator. Alternatively, either or both of the transmission signal generating circuitry and the reference signal generating circuitry may comprise a resonator element formed by electronic circuitry comprising a portion with inductive characteristics and a portion with capacitive characteristics.

The pulsed level gauge system may additionally comprise measurement circuitry configured to form a measurement signal comprising a sequence of values, each value representing a time correlation between a pulse of the electromagnetic reference signal and the electromagnetic reflection signal. This measurement circuitry may, for example, comprise a mixer and the measurement signal may be formed by mixing the electromagnetic reference signal and the electromagnetic reflection signal such that a pulse indicating time correlation is generated each time a reference pulse passes the time domain for the electromagnetic reflection signal. The pulses can then be provided to a sample-and-hold circuit to form a continuous signal.

According to various embodiments of the present invention, the level gauge system may be controllable between an active state with a relatively high energy consumption and an inactive state with a relatively low energy consumption. In the active state, the transmit signal may be generated and transmitted and at least one filling level measurement value may be determined. In the inactive state, at least parts of the level gauge system may be disabled. For instance, at least the transmit signal generating circuitry and the reference signal generating circuitry may be powered down or at least in an idle state.

In embodiments, furthermore, the filling level determining circuitry may be configured to determine the second filling level measurement value based additionally on stored data indicative of at least one previous filling level measurement value, if the signal acquired by the signal acquisition circuitry indicates that the time between consecutive filling level determinations is shorter than the predefined time.

According to some embodiments, the memory for storing the previous frequency control settings may be a non-volatile memory, such as a flash memory.

Furthermore, the pulsed level gauge system may advantageously additionally comprise a local energy store for providing electrical energy for operation of the level gauge system. The local energy store may advantageously, for example, comprise a battery and/or a super capacitor.

Moreover, the pulsed level gauge system may further comprise wireless communication circuitry, such as a radio transceiver, for wireless communication with a remote system.

According to embodiments, the level gauge system may further comprise loop interface circuitry for providing a measurement signal indicative of the filling level to a two-wire 4-20 mA current loop and for providing power from the two-wire current loop to the level gauge system, the two-wire 4-20 mA current loop being the only source of external power for the level gauge system.

Further effects and features of this second aspect of the present invention are largely analogous to those described above in connection with the first aspect of the invention.

According to a third aspect of the present invention, it is provided a level gauge system, for determining a filling level measurement value for a product in a tank, comprising: transmit signal generating circuitry for generating a pulsed electromagnetic transmit signal; a propagation device connected to the transmit signal generating circuitry and arranged to propagate the transmit signal towards a surface of the product, and to return an electromagnetic reflection signal resulting from reflection of the transmit signal at the surface; reference signal generating circuitry for generating a pulsed electromagnetic reference signal; a memory; and processing circuitry operatively connected to the transmit signal generating circuitry, the propagation device, the reference signal generating circuitry, and the memory for determining the filling level measurement value based on the reflection signal and the reference signal; wherein the processing circuitry is configured to: control at least one of the transmit signal generating circuitry and the reference signal generating circuitry using first frequency control settings selected to achieve a desired pulse repetition frequency difference between a pulse repetition frequency of the transmit signals and a pulse repetition frequency of the reference signals; control the transmit signal generating circuitry to generate and transmit a first transmit signal, and the reference signal generating circuitry to generate a first reference signal, using first frequency control settings selected to achieve a desired pulse repetition frequency difference between a pulse repetition frequency of the first transmit signal and a pulse repetition frequency of the first reference signal; determine a first filling level measurement value based on the first reference signal, and a first reflection signal resulting from reflection of the first transmit signal at the surface; determine an actual pulse repetition frequency difference between the pulse repetition frequency of the first transmit signal and the pulse repetition frequency of the first reference signal; determine second frequency control settings based on the first frequency control settings and a difference between a desired pulse repetition frequency and the actual pulse repetition frequency difference; store the second frequency control settings in the memory; acquire a signal indicative of a time between consecutive filling level determinations; if the acquired signal indicates that the time between consecutive filling level determinations is shorter than a predefined time: retrieve the second frequency control settings from the memory; control the transmit signal generating circuitry to generate and transmit a second transmit signal, and the reference signal generating circuitry to generate a second reference signal, using the second frequency control settings; determine a second filling level measurement value based on the second reference signal, and a second reflection signal resulting from reflection of the second transmit signal at the surface; if the acquired signal indicates that the time between consecutive filling level determinations is longer than the predefined time: regulate a pulse repetition frequency of at least one of the transmit signal generating circuitry and the reference signal generating circuitry towards achieving the desired pulse repetition frequency difference; control the transmit signal generating circuitry to generate and transmit a third transmit signal towards the surface; control the reference signal generating circuitry to generate a third reference signal; and determine a third filling level measurement value based on the third reference signal, and a third reflection signal resulting from reflection of the third transmit signal at the surface.

Further effects and features of this third aspect of the present invention are largely analogous to those described above in connection with the first and second aspects of the invention.

In summary, the present invention thus relates to a pulsed level gauge system comprising frequency control circuitry. If an acquired signal indicates that the time between the previous filling level determination and the present filling level determination is shorter than a predefined time, the frequency control circuitry controls at least one of a transmit signal generating circuitry and a reference signal generating circuitry comprised in the pulsed level gauge system using previous frequency control settings stored in memory. If the acquired signal indicates that the time between the previous filling level determination and the present filling level determination is longer than the predefined time, the frequency control circuitry iteratively regulates at least one of the transmit signal generating circuitry and the reference signal generating circuitry towards achieving a desired pulse repetition frequency difference between the pulse repetition frequency of the transmit signal and the pulse repetition frequency of the reference signal.

BRIEF DESCRIPTION OF THE DRAWINGS

These and other aspects of the present invention will now be described in more detail, with reference to the appended drawings showing an exemplary embodiment of the invention, wherein.

DETAILED DESCRIPTION OF EXAMPLE EMBODIMENTS

In the present detailed description, various embodiments of the level gauge system according to the present invention are mainly discussed with reference to a pulsed radar level gauge system of the non-contact type, in which an electromagnetic signal is propagated towards the product contained in the tank using a propagation device in the form of a radiating antenna, such as a cone antenna, a horn antenna, an array antenna or a patch antenna.

It should be noted that this by no means limits the scope of the present invention, which is equally applicable to a pulsed guided wave radar (GWR) level gauge system utilizing a propagation device in the form of a transmission line probe, such as a single line probe (including a so-called Goubau probe), a two-lead probe, a coaxial probe, etc.

Figure 1:
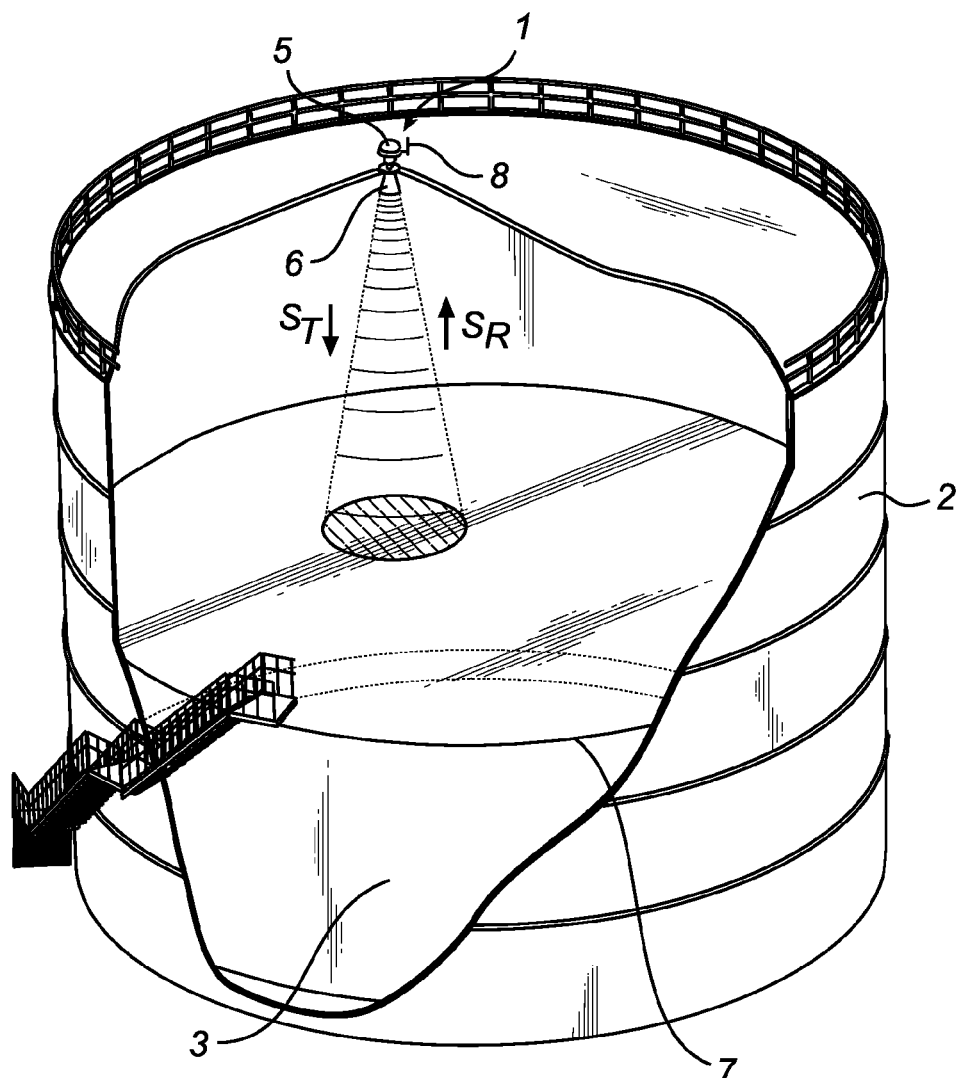
FIG. 1 schematically illustrates a pulsed level gauge system according to an embodiment of the present invention arranged to determine the filling level of a tank.

FIG. 1 schematically illustrates a level gauge system 1 arranged on top of a tank 2 for determining the filling level of a product 3 in the tank 2 using microwaves. The level gauge system 1 is therefore in the following referred to as a radar level gauge system or an RLG-system.

The radar level gauge system 1 comprises a measurement unit 5, a propagation device, here in the form of a horn antenna 6 for propagating microwaves towards a surface 7 of the product 3 contained in the tank 2, and a communication antenna 8 for allowing wireless communication with a remote device.

When measuring the filling level of the product 3 contained in the tank 2, the radar level gauge system 1 transmits an electromagnetic transmission signal $S_T$ by the horn antenna 6 towards the surface 7 of the product 3, where the signal is reflected as a surface echo signal $S_R$. The distance between a reference position at the top of the tank 2 and the surface 7 of the product 3 is then determined based on the time-of-flight of the surface echo signal $S_R$ (from the radar level gauge system 1 to the surface 7 and back). From this distance and known dimensions of the tank 2, the filling level can be deduced.

It should be noted that, although a tank 2 containing a single product 3 is discussed herein, the distance to any material interface present in the tank 2 can be measured in a similar manner.

As is schematically illustrated in FIG. 1, the exemplary level gauge system 1 is configured to communicate with external devices, such as a remote control center, using wireless data transmission. For different applications, this may be advantageous, as wiring for communication may often represent a significant part of the cost for installing a level gauge system. A level gauge system configured for wireless communication may often also be required to receive power from a local energy store, such as a battery or similar. To keep the maintenance cost of the level gauge system 1 down, battery life should be as long as possible, preferably in the order of several years, which means that it is important to design the level gauge system 1 for a very low average energy consumption, without compromising the performance of the level gauge system 1 in terms of, for example, accuracy and ability to monitor changes in the tank 2.

Figure 2:
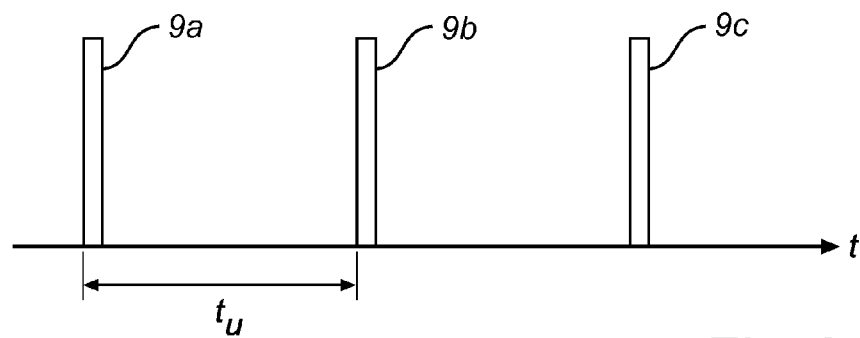
FIG. 2 schematically illustrates a driving scheme for intermittent operation of the level gauge system in FIG. 1.

A scheme for handling situations where the average energy consumption is important is schematically illustrated in FIG. 2. As is indicated in FIG. 2, filling level determination events 9a-c are separated in time, and between these filling level determination events 9a-c, the level gauge system 1 is in a sleep mode, where parts of the level gauge system that are used to determine the filling level may be turned off. This scheme may be referred to as intermittent operation, and the time $t_u$ between the filling level determination events defines an update frequency.

For a pulsed level gauge system, the various aspects of the present invention provide for shortening the duration of the filling level determination events 9a-c as compared to pulsed level gauge systems in the prior art.

This will be described in further detail below with reference to FIGS. 3 to 5.

Figure 3:
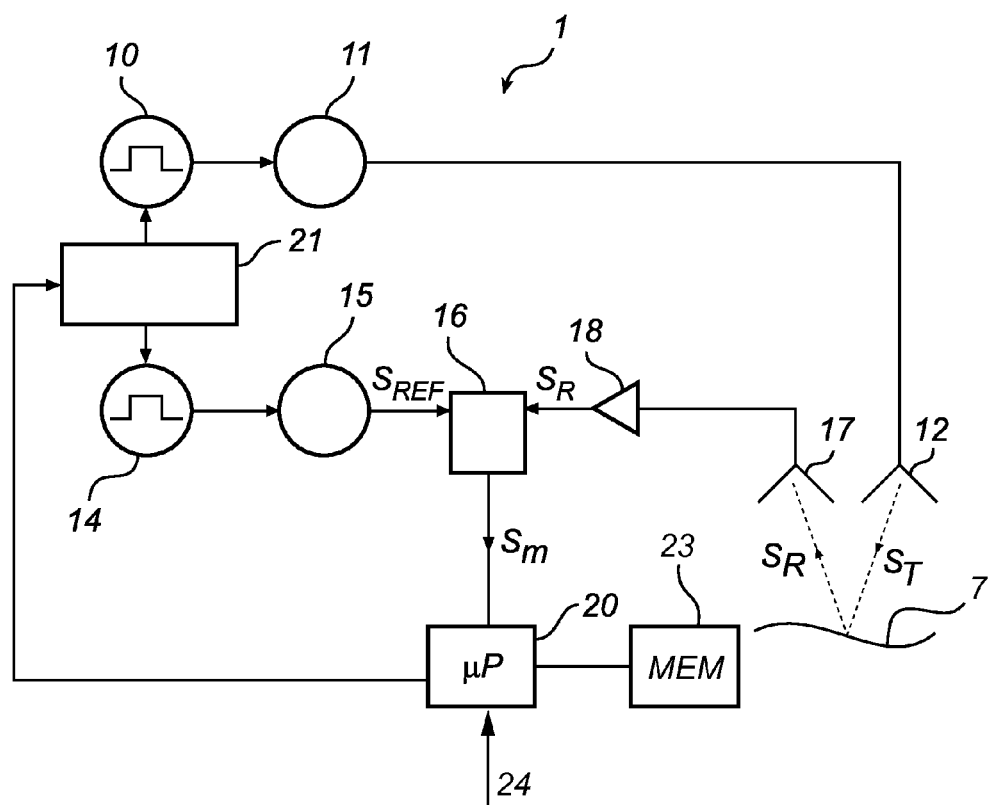
FIG. 3 is a schematic block diagram of a first embodiment of the pulsed level gauge system in FIG. 1.

FIG. 3 is a block diagram schematically showing functional components comprised in a first embodiment of the level gauge system in FIG. 1. The exemplary level gauge system 1 comprises a transmitter branch and a receiver branch.

The transmitter branch comprises transmit signal generating circuitry, here provided in the form of a transmit pulse generator 10 and a first RF-source 11, and a transmitting antenna 12. The receiver branch comprises reference signal generating circuitry, here provided in the form of a reference pulse generator 14 and a second RF-source 15, measurement circuitry 16, and a receiving antenna 17. The receiver branch further comprises a low noise amplifier 18 for amplifying the signals received by the receiving antenna 17.

In the transmitter branch, the microwaves generated by the first RF-source 11 are modulated by the transmit pulses provided by the transmit pulse generator 10 so that a transmit signal $S_T$ in the form of a sequence of transmit pulses (short "packets" of microwave energy) is formed and is radiated towards the surface 7 of the product by the transmitting antenna 12.

The reflected signal $S_R$ is received by the receiving antenna 17 and is, following amplification in the low noise amplifier 18, forwarded to the measurement circuitry 16. The measurement circuitry 16 is also provided with a reference signal $S_{REF}$, which is formed by the reference pulse generator 14 and the second RF-source 15 as was described above for the generation of the transmission signal $S_T$.

The transmit pulse generator 10 and the reference pulse generator 14 generate pulses with slightly different pulse repetition frequencies. The pulse repetition frequency difference $\Delta f$ between the transmit pulse repetition frequency and the reference pulse repetition frequency may be in the order of Hz or tens of Hz.

In the measurement circuitry 16, the reference signal $S_{REF}$ and the reflected signal $S_R$ are time correlated to form a time-expanded measurement signal $S_m$, which is provided to the microprocessor 20, where the distance to the surface 7 of the product is determined based on the measurement signal $S_m$.

The measurement circuitry 16 may, for example, comprise a mixer and a sample-and-hold amplifier, but could be implemented in other ways known to those skilled in the art. For example, the sample-and-hold amplifier may be configured to achieve time-correlation by controlling the sampling switch using the reference signal $S_{REF}$.

The pulses of the transmit signal $S_T$ and the pulses of the reference signal $S_{REF}$ may advantageously be in phase at the start of a measurement sweep so that the time until there is correlation between the reference signal $S_{REF}$ and the reflected signal $S_R$ together with the known frequency difference $\Delta f$ can be used to determine the time-of-flight of the reflected signal $S_R$. The time-of-flight is then used to determine the filling level.

As can be seen in FIG. 3, the level gauge system 1 further comprises frequency control circuitry 21, which is connected to the microprocessor 20, and to the transmit pulse generator 10 and the reference pulse generator 14, for controlling the pulse repetition frequency of at least one of the transmit pulse generator 10 and the reference pulse generator 14.

The pulsed level gauge system 1 further comprises a memory 23 connected to the microprocessor 20.

In a pulsed level gauge system 1 utilizing time-expansion techniques for forming a time-expanded measurement signal $S_m$ from which the filling level can be determined as described above, it is important that at least one of the transmit pulse generator 10 and the reference pulse generator 14 is controlled by the frequency control circuitry 21 to achieve a pulse repetition frequency $\Delta f$ sufficiently close to the desired frequency difference at least before the start of each filling level determination event 9a-c.

As was described above in the Summary section, the time for regulating the above-mentioned pulse repetition frequency difference $\Delta f$ may constitute a rather large portion of the total time for a filling level determination event 9a-c, and it would be desirable to reduce the time for arriving at a sufficiently good pulse repetition frequency difference $\Delta f$ (sufficiently close to the desired pulse repetition frequency difference for which the radar level gauge system is designed). As was also described in the Summary section, embodiments of the present invention make use of a signal (indicated by reference numeral 24 in FIG. 3) indicative of the time $t_u$ between consecutive filling level determination events 9a-c to determine which procedure to use for controlling at least one of the transmit pulse generator 10 and the reference pulse generator 14 to arrive at a sufficiently good pulse repetition frequency difference $\Delta f$.

The time $t_u$ may be equivalent to the update rate if the filling level determination events 9a-c occur at regular intervals.

A second embodiment of the radar level gauge system 1 will now be described with reference to FIG. 4, with more focus on the structure of the circuitry which controls operation of the radar level gauge system 1. Furthermore, the embodiment of FIG. 4 differs from that described above with reference to FIG. 3 in that the propagation device is provided in the form of a transmission line probe 35, and in that the DC-pulses generated by the transmit signal generator 10 are provided to the probe 35 without first modulating a microwave source. Analogously, the DC-pulses generated by the reference signal generator 14 are provided to the measurement circuitry without first modulating a microwave source.

Figure 4:
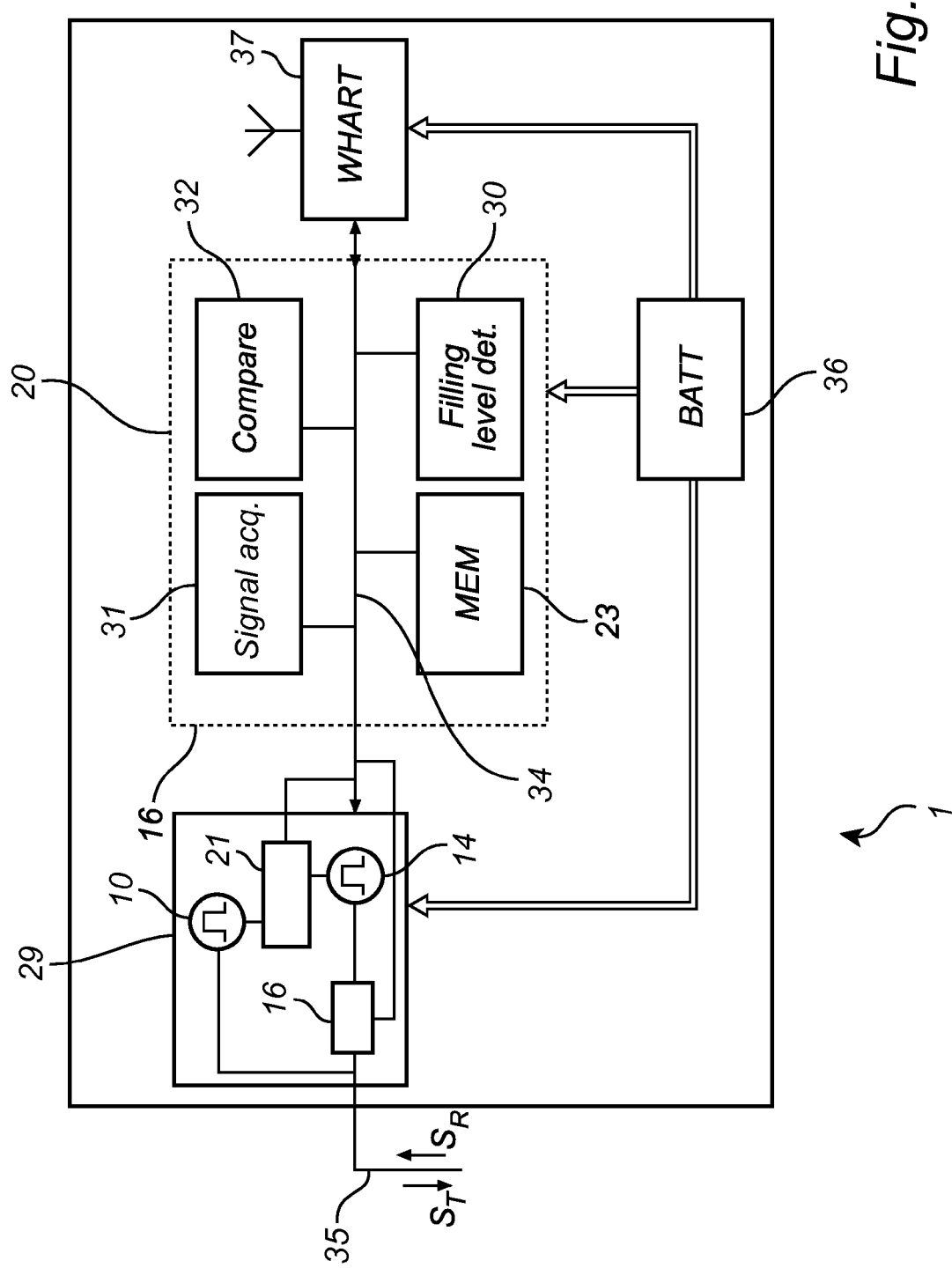
FIG. 4 is a schematic block diagram of a second embodiment of the pulsed level gauge system in FIG. 1.
Figure 5:
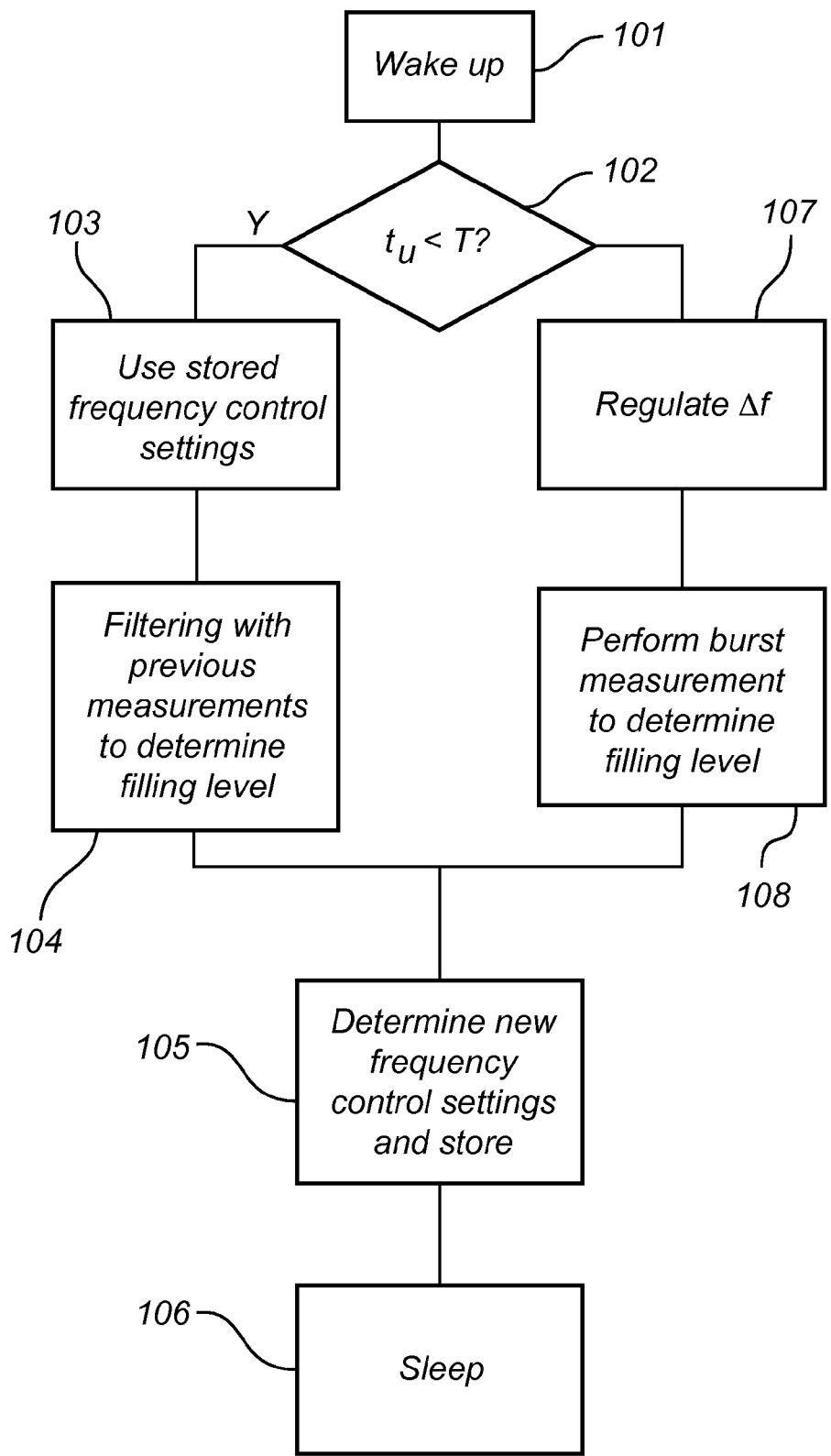
FIG. 5 is a flow chart outlining a method according to an embodiment of the invention.

Referring to FIG. 4, the radar level gauge system 1 comprises a transceiver 29, processing circuitry 20, a wireless communication unit 37, which may advantageously be compliant with WirelessHART (IEC 62591), and a battery 36. The processing circuitry 20 comprises signal acquisition circuitry 31, comparing circuitry 32, filling level determining circuitry 30 and a memory 23. These functional units comprised in the processing circuitry 20 may be implemented as separate hardware units, in the form of software blocks run on a microprocessor, or as a combination of separate hardware units and software run on a microprocessor.

The different circuits comprised in the processing circuitry 16 may be connected to a communication bus 34, and the transceiver 29 and the wireless communication unit 37 may be connected to the communication bus 34 through a suitable data interface. Furthermore, the transceiver 29, the processing circuitry 20 and the wireless communication unit 37 all receive energy from the battery 36 as is indicated by the block arrows in FIG. 4.

The transceiver 29 comprises a transmitter branch including the transmit signal generator 10 and a receiver branch including the reference signal generator 14 and the measurement circuitry 16. The transceiver 29 further comprises frequency control circuitry 21 for controlling at least one of the transmit signal generator 10 and the reference signal generator 14 to achieve a pulse repetition frequency difference $\Delta f$ that is sufficiently close to the above-mentioned desired pulse repetition frequency difference.

To transition the radar level gauge system 1 from its inactive state to its active state in order to start a filling level measurement event 9a-c (see FIG. 2), the radar level gauge system may, for example, receive a wake-up signal via the wireless communication unit 37. Alternatively, the radar level gauge system 1 may have an internal timer that has been configured to provide a wake-up signal when it is time to start a filling level measurement event.

When the level gauge system 1 is in operation, the transceiver 29 generates and transmits electromagnetic signals $S_T$ and receives a surface echo signal $S_R$. A measurement signal from which the time-of-flight of the surface echo signal can be determined is provided from the transceiver 29 to the processing circuitry 20.

The processing circuitry 20 determines the filling level, and/or another process parameter, and provides this information to a remote location via the wireless communication unit 37.

The processing circuitry 20 may also receive various commands via the wireless communication unit 37 and may control the transceiver 29 in response to such commands. In particular, the processing circuitry 20 may, as described above, receive wake-up signals via the wireless communication unit 37, perform a filling level determination, report the determined filling level and then go back to sleep.

With reference to the flow chart in FIG. 5 and the block diagram in FIG. 4, an exemplary method according to an embodiment of the present invention will now be described.

In a first step 101, the level gauge system 1 is controlled from an inactive state to an active state. In practice, a wake-up command may be received by the wireless communication unit 37, which then provides a wake-up signal to the processing circuitry 20. In response to the wake-up signal, the signal acquisition circuitry 31 acquires a signal indicative of the time $t_u$ between consecutive filling level measurement events 9a-c. In step 102, the acquired time $t_u$ is compared with a predefined threshold time T by the comparing circuitry 32.

If it is determined in step 102 that the time $t_u$ between consecutive filling level determination events 9a-c is shorter than the predefined threshold time T, the method proceeds to step 103. Otherwise, if the time $t_u$ between consecutive filling level determination events 9a-c is longer than the predefined threshold time T, the method instead proceeds to step 107.

In step 103, stored frequency control settings are retrieved from the memory 23 and used by the frequency control circuitry 21 to control at least one of the transmit signal generator 10 and the reference signal generator 14 without any further regulation of the pulse repetition frequency difference $\Delta f$.

Subsequently, in step 104, a filling level measurement is carried out and a filling level measurement value determined by the filling level determining circuitry 30 based on the received reflection signal, the reference signal and the pulse repetition frequency difference $\Delta f$. The pulse repetition frequency difference used by the filling level determining circuitry 30 may either be the desired pulse repetition frequency difference $\Delta f_{desired}$, or a measured value of the actual pulse repetition frequency difference $\Delta f_{actual}$.

If, referring briefly to FIG. 2, the filling level measurement takes place during the second filling level measurement event 9b, then, In embodiments of the present invention, the filling level measurement value output by the radar level gauge system 1 may advantageously be determined by filtering the present filling level measurement with a previous filling level measurement carried out during the previous filling level measurement event 9a. This procedure may even further reduce the energy consumption of the radar level gauge system, since only one (or a few) filling level measurements are carried out during the present filling level measurement event 9b.

Following determination of the filling level, frequency control settings may be stored in memory 23 in step 105. The frequency control settings stored in memory 23 may be the same frequency control settings that were used during the present filling level measurement event 9b, or the stored frequency control settings may be updated frequency control settings formed by adjusting the frequency control settings used during the present filling level measurement event 9b based on a measurement of the actual pulse repetition frequency difference $\Delta f_{actual}$.

Alternatively, the measured actual pulse repetition frequency difference $\Delta f_{actual}$ may be stored in memory 23 and the updated frequency control settings be determined at the start of the next filling level measurement event 9c.

Finally, after having determined and output the filling level measurement value and stored frequency control settings in memory 23, the radar level gauge system 1 is again transitioned to its inactive state in step 106.

If, in step 102, it is instead determined that the time $t_u$ between consecutive filling level measurement events 9a-c is longer than the predefined threshold time T, the method instead proceeds to step 107, and performs a full regulation of the pulse repetition frequency difference $\Delta f$ towards the desired pulse repetition frequency difference $\Delta f_{desired}$. As is well known to those skilled in the art, such regulation involves to iteratively control at least one of the transmit signal regulator 10 and the reference signal regulator 14, and measure the resulting actual pulse repetition frequency difference $\Delta f_{actual}$. The regulation stops when the actual pulse repetition frequency difference $\Delta f_{actual}$ is sufficiently close to the desired pulse repetition frequency difference $\Delta f_{desired}$.

When this is the case, the filling level is determined in step 108. Due to the relatively long time between the present filling level determination event, say 9b, and the previous filling level determination event 9a, it cannot be assumed that the filling level is substantially the same as during the previous filling level determination event 9a. Therefore, the filling level measurement value determined during the previous filling level determination event 9a is not used for the determination of the present filling level measurement value.

Instead, the transceiver 29 may be controlled to perform several filling level measurements (a burst of measurements), each involving transmitting a transmit signal towards the surface, receiving a reflection signal and determining a filling level measurement value based on the reflection signal, the reference signal and the pulse repetition frequency difference $\Delta f$. This procedure may be repeated a number of times until a sufficient number of measurement values $X_1, X_2, \ldots, X_n$ have been provided to achieve a desired trade off between energy consumption and measurement accuracy. This may depend on the field of application and/or on the conditions in the tank.

The filling level $X_N$ to be output by the radar level gauge system 1 may be determined by the filling level determining circuitry 30 by filtering the measurement values $X_1, X_2, \ldots, X_n$ (or a subset of these measurement values, such as $X_2, \ldots, X_n$). The frequency control settings (together with the new filling level $X_N$) is stored in memory 23 in step 105, and the level gauge system 1 is returned to its inactive state in step 106.

The person skilled in the art realizes that the present invention by no means is limited to the preferred embodiments described above. On the contrary, many modifications and variations are possible within the scope of the appended claims, for example the control voltage used to control the reference pulse generator 14 may be kept constant and the control voltage for the transmission pulse generator 10 may be controlled, or the control voltages for both the transmission pulse generator 10 and the reference pulse generator 14 may be controlled towards achieving the desired frequency difference.

What is claimed is:

1. A method of determining a filling level of a product in a tank, using a level gauge system comprising:
   transmit signal generating circuitry for generating pulsed electromagnetic transmit signals;
   a propagation device connected to said transmit signal generating circuitry and arranged to propagate said transmit signals towards a surface of said product, and to return electromagnetic reflection signals resulting from reflection of said transmit signals at said surface; and
   reference signal generating circuitry for generating pulsed electromagnetic reference signals,
   said method comprising the steps of:
   controlling at least one of said transmit signal generating circuitry and said reference signal generating circuitry using first frequency control settings selected to achieve a desired pulse repetition frequency difference between a pulse repetition frequency of said transmit signals and a pulse repetition frequency of said reference signals;
   transmitting a first transmit signal towards said surface;
   receiving a first reflection signal resulting from reflection of said first transmit signal at said surface;
   generating a first reference signal;
   determining a first filling level measurement value level based on said first reflection signal and said first reference signal;
   determining an actual pulse repetition frequency difference between the pulse repetition frequency of said first transmit signal and the pulse repetition frequency of said first reference signal;
   determining second frequency control settings based on said first frequency control settings and a difference between said desired pulse repetition frequency and said actual pulse repetition frequency difference;
   storing said second frequency control settings;
   acquiring a signal indicative of a time between consecutive filling level determinations;
   if the acquired signal indicates that the time between consecutive filling level determinations is shorter than a predefined time then performing steps a1) to f1):
   a1) retrieving said second frequency control settings;
   b1) controlling at least one of said transmit signal generating circuitry and said reference signal generating circuitry using said second frequency control settings;
   c1) transmitting a second transmit signal towards said surface;
   d1) receiving a second reflection signal resulting from reflection of said second transmit signal at said surface;
   e1) generating a second reference signal; and
   f1) determining a second filling level measurement value based on said second reflection signal and said second reference signal;
   if the acquired signal indicates that the time between consecutive filling level determinations is longer than said predefined time then performing steps a2) to e2):
   a2) regulating a pulse repetition frequency of at least one of said transmit signal generating circuitry and said reference signal generating circuitry towards achieving said desired pulse repetition frequency difference;
   b2) transmitting a third transmit signal towards said surface;
   c2) receiving a third reflection signal resulting from reflection of said third transmit signal at said surface;
   d2) generating a third reference signal; and
   e2) determining a third filling level measurement value based on said third reflection signal and said third reference signal.

2. The method according to claim 1, wherein the first filling level measurement value is determined additionally based on said desired pulse repetition frequency difference.

3. The method according to claim 1, wherein said first filling level measurement value is determined additionally based on said actual pulse repetition frequency difference.

4. The method according to claim 1, further comprising the steps of:
   providing a wake-up signal to said level gauge system prior to the step of transmitting said first transmit signal; and
   providing a sleep signal to said level gauge system after the step of storing said second frequency control settings and before the step of transmitting said second transmit signal.

5. The method according to claim 1, wherein:
   if the acquired signal indicates that the time between consecutive filling level determinations is shorter than said predefined time:
   said second filling level measurement value is determined based additionally on stored data indicative of at least said first filling level measurement value.

6. A level gauge system, for determining a filling level measurement value for a product in a tank, comprising:
   transmit signal generating circuitry for generating a pulsed electromagnetic transmit signal;
   a propagation device connected to said transmit signal generating circuitry and arranged to propagate said transmit signal towards a surface of said product, and to return an electromagnetic reflection signal resulting from reflection of said transmit signal at said surface;
   reference signal generating circuitry for generating a pulsed electromagnetic reference signal;
   filling level determining circuitry connected to said propagation device and to said reference signal generating circuitry for determining said filling level measurement value based on said reflection signal, said reference signal, and a pulse repetition frequency difference between a pulse repetition frequency of said transmit signal and a pulse repetition frequency of said reference signal;
   a memory for storing previous frequency control settings for control of at least one of said transmit signal generating circuitry and said reference signal generating circuitry to achieve said pulse repetition frequency difference, said previous frequency control settings being determined in connection with a previous filling level determination;
   signal acquisition circuitry for acquiring a signal indicative of a time between the previous filling level determination and a present filling level determination;
   comparing circuitry connected to said signal acquisition circuitry for comparing the time indicated by said signal with a predefined time;
   frequency control circuitry connected to said comparing circuitry, to said memory, and to at least one of said transmit signal generating circuitry and said reference signal generating circuitry for:
   if the acquired signal indicates that the time between the previous filling level determination and the present filling level determination is shorter than said predefined time, controlling at least one of said transmit signal generating circuitry and said reference signal generating circuitry using the previous frequency control settings stored in said memory; and if the acquired signal indicates that the time between the previous filling level determination and the present filling level determination is longer than said predefined time, iteratively regulating at least one of said transmit signal generating circuitry and said reference signal generating circuitry towards achieving a desired pulse repetition frequency difference between the pulse repetition frequency of said transmit signal and the pulse repetition frequency of said reference signal.

7. The level gauge system according to claim 6, wherein said level gauge system is controllable between an active state and an inactive state.

8. The level gauge system according to claim 6, wherein:
if the signal acquired by said signal acquisition circuitry indicates that the time between the previous filling level determination and the present filling level determination is shorter than said predefined time, said filling level determining circuitry determines said filling level measurement value based additionally on stored data indicative of at least one previous filling level measurement value.

9. The level gauge system according to claim 6, wherein said level gauge system further comprises a local energy store for providing electrical energy for operation of said level gauge system.

10. The level gauge system according to claim 6, wherein said level gauge system further comprises wireless communication circuitry for wireless communication with a remote system.

11. The level gauge system according to claim 6, further comprising loop interface circuitry for providing a measurement signal indicative of said filling level to a two-wire 4-20 mA current loop and for providing power from said two-wire current loop to said level gauge system, said two-wire 4-20 mA current loop being the only source of external power for the level gauge system.

12. A level gauge system, for determining a filling level measurement value for a product in a tank, comprising:
transmit signal generating circuitry for generating a pulsed electromagnetic transmit signal;
a propagation device connected to said transmit signal generating circuitry and arranged to propagate said transmit signal towards a surface of said product, and to return an electromagnetic reflection signal resulting from reflection of said transmit signal at said surface;
reference signal generating circuitry for generating a pulsed electromagnetic reference signal;
a memory; and
processing circuitry operatively connected to said transmit signal generating circuitry, said propagation device, said reference signal generating circuitry, and said memory for determining said filling level measurement value based on said reflection signal and said reference signal;
wherein said processing circuitry is configured to:
control at least one of said transmit signal generating circuitry and said reference signal generating circuitry using first frequency control settings selected to achieve a desired pulse repetition frequency difference between a pulse repetition frequency of said transmit signals and a pulse repetition frequency of said reference signals;

control said transmit signal generating circuitry to generate and transmit a first transmit signal, and said reference signal generating circuitry to generate a first reference signal, using first frequency control settings selected to achieve a desired pulse repetition frequency difference between a pulse repetition frequency of said first transmit signal and a pulse repetition frequency of said first reference signal;
determine a first filling level measurement value based on said first reference signal, and a first reflection signal resulting from reflection of said first transmit signal at said surface;
determine an actual pulse repetition frequency difference between the pulse repetition frequency of said first transmit signal and the pulse repetition frequency of said first reference signal;
determine second frequency control settings based on said first frequency control settings and a difference between a desired pulse repetition frequency and said actual pulse repetition frequency difference;
store said second frequency control settings in said memory;
acquire a signal indicative of a time between consecutive filling level determinations;
if the acquired signal indicates that the time between consecutive filling level determinations is shorter than a predefined time:
retrieve said second frequency control settings from said memory;
control said transmit signal generating circuitry to generate and transmit a second transmit signal, and said reference signal generating circuitry to generate a second reference signal, using said second frequency control settings;
determine a second filling level measurement value based on said second reference signal, and a second reflection signal resulting from reflection of said second transmit signal at said surface;
if the acquired signal indicates that the time between consecutive filling level determinations is longer than said predefined time:
regulate a pulse repetition frequency of at least one of said transmit signal generating circuitry and said reference signal generating circuitry towards achieving said desired pulse repetition frequency difference;
control the transmit signal generating circuitry to generate and transmit a third transmit signal towards said surface;
control said reference signal generating circuitry to generate a third reference signal; and
determine a third filling level measurement value based on said third reference signal, and a third reflection signal resulting from reflection of said third transmit signal at said surface.

13. The level gauge system according to claim 12, wherein:
if the acquired signal indicates that the time between consecutive filling level determinations is shorter than said predefined time:
said second filling level measurement value is determined based additionally on stored data indicative of at least said first filling level measurement value.

* * * * *